3,790,533
PRESSURE SENSITIVE ADHESIVE COPOLYMERS
AND TAPES THEREFROM
Carlos M. Samour, 324 Linden St.,
Wellesley, Mass. 02134
No Drawing. Filed Jan. 26, 1972, Ser. No. 221,106
Int. Cl. C08f 15/40
U.S. Cl. 260—78.5 R                             20 Claims

ABSTRACT OF THE DISCLOSURE

Pressure sensitive adhesive polymers of monomers consisting of certain carboxylic acid vinyl monomers, an aminoalkyl acrylate or methacrylate in an amount which is within ±10% of the acid-base equivalent of the carboxylic acid vinyl monomers, and an alkyl acrylate in an amount from 65 to 99.6% by weight of the total monomers. Other copolymerizable monomers may optionally be present, including cross-linking monomers. Tapes coated with the pressure sensitive adhesive polymers are described.

---

This invention relates to polymers and pertains more specifically to pressure sensitive adhesive polymers and to flexible sheet material coated with such polymers including pressure sensitive adhesive tape.

It has hitherto been proposed to make pressure sensitive adhesive copolymers containing external salts of aminoalkyl acrylates or methacrylates, such as the hydrochloride salts of these compounds. However, such adhesive compositions when used in contact with human skin tend to cause irritation.

The present invention provides pressure sensitive adhesives which are substantially nonirritant to human skin and are also useful as pressure sensitive adhesive industrial coatings by employing as the principal constituent of the adhesive mass interpolymers of certain carboxylic acid vinyl monomers with certain aminoalkyl acrylates or methacrylates and with certain alkyl acrylates, the amount of carboxylic acid vinyl monomer being from 0.2 to 20% by weight of the total monomer but in no event more than an amount stoichiometrically equivalent (in terms of acidity) to 10% by weight of acrylic acid, the amount of aminoalkyl acrylate or methacrylate being within ±10% of the amount which is the stoichiometric acid-base equivalent of the carboxylic acid vinyl monomer and in any event being from 0.2 to 15% by weight of the total monomers, and the alkyl acrylates, consitituting the third essential monomer, amounting to approximately 65 to 99.6% by weight of the total essential monomers. It will be understood that each of the three types of monomers may be a mixture of individually different monomers, each of which has its own formula but all of which fall within the definitions set forth below. Indeed, in the case of the alkyl acrylates, the third type of monomer, this constituent preferably is composed of a mixture of alkyl acrylates differing from each other in the identity of the alkyl group but in which the average size of the alkyl groups is as stated.

The polymers of this invention may contain recurring units other than the essential carboxylic acid vinyl monomer, aminoalkyl acrylate or methacrylate, and alkyl acrylate recurring units. The other recurring units may be characterized in their corresponding monomeric form as monomers copolymerizable with the foregoing monomers; that is, the polymers of the adhesive coatings of this invention are polymers of monomers consisting essentially of carboxylic acid vinyl monomers, aminoalkyl acrylates or methacrylates, and alkyl acrylates, and, optionally one or more copolymerizable monomers in amounts which do not materially adversely affect the use of the polymers as pressure-sensitive adhesive coatings. In general, the amounts of such optional copolymerizable monomers may be up to 50% by weight of the alkyl acrylate component; however, in the case of cross-linking monomers having functional groups which can react with other reactive groups in the polymers thereby cross-linking the polymers, the amounts may be up to 10% by weight, preferably from 0.2 to 5% by weight of the alkyl acrylate. Examples of optional copolymerizable monomers include acrylonitrile, methacrylonitrile, acrylamide, methacrylamide, benzyl acrylate, dehydroabietyl acrylate, dihydroabietyl methacrylate, cyclohexyl acrylate, chloroethyl acrylate, fluoroethyl acrylate, cyanoethyl acrylate, ethoxyethyl methacrylate, vinyl esters and ethers and vinyl aromatic compounds such as vinyl acetate, vinyl butyrate, methyl vinyl ether, octyl vinyl ether, styrene; cross-linking monomers include glycidyl acrylate, glycidyl methacrylate and N-methylolacrylamide as well as divinyl compounds such as ethylene glycol diacrylate and dimethacrylate, allyl acrylate, and divinyl benzene.

The carboxylic acid vinyl monomer which may form a part of the interpolymers includes acrylic acid, methacrylic acid, maleic acid, fumaric acid, itaconic acid, citraconic acid and those monomers having the formula

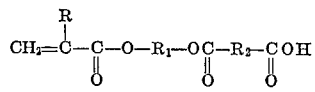

in which R is hydrogen or methyl, $R_1$ is an alkylene group having from 2 to 10 carbon atoms such as ethylene, propylene, butylene, octylene, or decylene or $R_1$ is

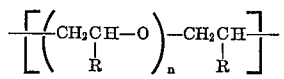

where $n$ is 1 to 4; and $R_2$ is alkylene having 2 to 26 carbon atoms, phenylene, a 5- to 6-membered monocyclic or 7- to 8-membered bicyclic ring having a carbon-to-carbon skeletal chain and being free from aromatic unsaturation including those in which one or more of the hydrogen atoms of said phenylene or of said rings is replaced by lower alkyl or by a halogen atom, provided that the valences in $R_2$ connected to the adjacent carbonyl groups are on adjacent carbon atoms or on those separated by one additional carbon atom, and the number of ring carbon atoms between the carbonyl groups is 1 or 2. Preferably $R_1$ is an alkylene group having from 2 to 4 carbon atoms such as ethylene, propylene or butylene, and $R_2$ is alkylene having from 1 to 4 carbon atoms, o-phenylene, or cyclohexylene; $R_2$ is most desirably alkylene having from 1 to 4 carbon atoms.

When the polymers are prepared in aqueous emulsion or dispersion, or when the appropriate amount of water is added to a solution polymerization system employing an organic solvent, maleic anhydride, itaconic anhydride and citraconic anhydride may be used as the precursors of the corresponding acids with the same effect. The carboxylic acid vinyl monomers having the structural formula set forth above can be prepared by reacting the appropriate hydroxyalkyl acrylate or methacrylate, or the reaction product of ethylene oxide with acrylic or methacrylic acid, with the appropriate dicarboxylic acid anhydride by the procedure described in U.S. Pat. 3,150,118 or in Canadian Pat. 835,420. Among suitable anhydrides are malonic, succinic, glutaric, o-phthalic, or 1,2-cyclohexane dicarboxylic anhydrides as well as those aliphatic succinic anhydrides wherein the aliphatic group is saturated or unsaturated and either straight or branched, or mixtures of such anhydrides. Preferred are alkenyl succinic anhydrides in which the alkenyl group averages 8 to 24 carbon atoms, e.g. octenyl succinic anhydride, tetracosenyl succinic anhydride, etc. Anhydrides having a 5 to 6 membered monocyclic ring include 1,2-cyclopentane dicarboxylic anhydride; 1,1-cyclopentane diacetic anhydride; 1,2-cyclohexane dicarboxylic anhydride; tetrahydrophthalic anhydride; 1,2-cyclopent-1-ene dicarboxylic anhydride; 1,2-cyclopent-3-ene dicarboxylic anhydride; etc. Suitable anhydrides having a 7 to 8 membered bicyclic ring include 5-norbornene 2,3-dicarboxylic anhydride; bicyclo[2.2.2]-heptane dicarboxylic anhydride; bicyclo[2.2.2]-octene-5-dicarboxylic anhydride; bicyclo[2.2.2]-octane dicarboxylic anhydride; etc. The anhydrides of lower alkyl, i.e. alkyl having 1 to 3 carbon atoms, and halo substituted derivatives of phenylene, 5 to 6 membered cyclic ring compounds and 7 to 8 membered bicyclic ring compounds include tetrachlorophthalic anhydride; tetrabromophthalic anhydride; tetrafluorophthalic anhydride; methyl tetrahydrophthalic anhydride; iso-propyl tetrahydrophthalic anhydride; methyl-5-norbornene-2,3-dicarboxylic anhydride; etc.

The aminoalkyl acrylates or methacrylates which can be used in the terpolymers of the present invention include those having the following formula:

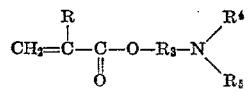

in which R is hydrogen or methyl, $R_3$ is alkylene having from 2 to 12 carbon atoms including ethylene, propylene, butylene, hexylene, and decylene, preferably alkylene from 2 to 3 carbon atoms, and $R_4$ and $R_5$ is each an alkyl group having from 1 to 4 carbon atoms except that when $R_4$ is tertiary butyl $R_5$ is hydrogen.

The alkyl acrylates constituting the remaining essential monomer making up the interpolymers, from about 99.6 to about 65% by weight of the total monomers, are those in which the molecules have the formula

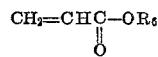

in which $R_6$ groups are selected from alkyl groups up to and including 18 carbon atoms, the average number of carbon atoms of the alkyl groups present being from about 4 to about 14. That is, when an alkyl acrylate having less than 4 or more than 14 carbon atoms in the alkyl group is used, it must be used in admixture with a different alkyl acrylate in such proportions that the average alkyl group present in the mixture has from 4 to 14 carbon atoms.

In the preferred interpolymer compositions of the present invention, the amount of carboxylic acid vinyl monomer is from 0.5 to 5% by weight of the total monomers when the carboxylic monomer is acrylic acid, or an equivalent amount (in terms of acidity) of another carboxylic monomer from the group defined above.

The aminoalkyl acrylates and methacrylates are known compounds and may be prepared by esterification of the appropriate aminoalcohol with acrylic or methacrylic acid.

The alkyl acrylates used in the polymers of the present invention are also well known and can be made by esterifying acrylic acid with at least one alcohol. Where only one alcohol is employed, it must have from about 4 to about 14 carbon atoms; where mixtures of alcohols are used for the esterification, the individual alcohols can contain from 1 up to and including 18 carbon atoms providing the average number of carbon atoms in the mixture of alcohols is from about 4 to about 14. In preferred embodiments of the invention, the average number of carbon atoms in the $R_6$ alkyl groups is from about 4 to about 10.

While it is possible in formulating pressure sensitive adhesive products embodying the interpolymers of the present invention, to mix with the polymer other materials for reasons incidental to or for the purpose of supplementing its inherent adhesive properties, the presence of such additional or supplemental materials is usually unnecessary. For example, instead of using a cross-linking comonomer as described above, cross-linking of the polymer can be accomplished by exposure to irradiation (e.g. U.V. or electron beam), by adding organic peroxides, epoxy compounds, formaldehyde resins, or polyfunctional organic compounds such as polyisocyanates. The polymers of this invention are compatible with a variety of resins, among which are tackifier resins such as rosin and rosin esters, hydrogenated rosin, phenolformaldehyde resins, terpene resins, etc., as well as with plasticizers commonly used in pressure sensitive adhesive compositions such as dialkyl phthalates, e.g., dioctyl phthalate, dialkyl esters of aliphatic dicarboxylic acids, e.g., dioctyl adipate, diphenyl ether, tricresyl phosphate, and the like, any of which can be used in conjuction with the polymers of the present invention to modify their properties.

The polymers of the present invention may be prepared by polymerizing together the three essential types of monomers described above in any of the usual emulsion or solution polymerization procedures. Various types of catalysts ore initiators useful in the polymerization of acrylate and methacrylate monomers may be employed in the production of the polymers of this invention. Examples of peroxide-type, free radical polymerization initiators are inorganic peroxides, such as hydrogen peroxide and barium peroxide; organic peroxides such as dicumyl peroxide, di-(tertiary butyl) peroxide, cumyl hydrogen peroxide, diacetyl peroxide, and dibenzoyl peroxide; azo-bis-(aliphatic nitriles); and inorganic per-acids, such as ammonium persulfate, potassium persulfate and potassium percarbonate. These initiators can be used alone or in the presence of reducing agents such as ferrous salts, cuprous salts, bisulfite, thiosulfate, hydrosulfite and tetrathionate salts, dimethylaniline triethanolamine, and alkylene polyamines. Other types of initiating systems may be used for the preparation of these polymers for example, ultraviolet light in the presence of organic peroxides or photosensitizers such as benzophenone. The choice of catalysts depends upon a variety of factors well known to the art. The type of monomers to be polymerized and the type of polymerization, whether solution or emulsion are factors, for example. In the case of aqueous emulsion polymerization, the pH of the emulsion, the type of the emulsifier and the temperature of the emulsion are also factors. In general, the amounts of the initiators used in the preferred aqueous emulsion polymerization system may vary from as little as 0.1 or lower to about 2 parts per 100 parts of total monomers.

Many different types of emulsifiers can be used in aqueous emulsion polymerization as is well known to the art including anionic, nonionic and cationic emulsifiers. Emulsifiers of these types commonly used in acrylate and methacrylate aqueous emulsion polymerization systems can in general be used with success in preparing the polymers of the present invention. The polymer can be used in the form of the emulsion or dispersion in which it is produced with or without the addition of conventional thickening agents or it can be separated from the polymerization medium by coagulation with acids, salts, or by freezing, and the resulting coagulum may be washed and/or dried before use if desired.

Polymers prepared by solution polymerization may be used in the form of the solution as it is obtained from the polymerization vessel, or it may be diluted if desired; from it a film or coating of the polymer may be laid down on a conventional flexible backing or tape in the usual manner.

The following examples are intended to illustrate more fully the nature of the invention without acting as a limitation upon its scope. In each of the examples, the polymerization was carried out in a glass vessel, suitably equipped with a stirrer, thermometer, condenser, and means for flushing the interior with nitrogen gas. The vessel was flushed with nitrogen before beginning the polymerization in each case and a slight positive pressure of nitrogen was maintained in the vessel during polymerization. In each example, the parts are by weight unless otherwise noted.

EXAMPLE 1

To a solution of 7.0 parts acrylic acid, 15.3 parts dimethylaminoethyl methacrylate and 77.7 parts 2-ethyl hexyl acrylate in 72 parts of ethyl acetate at 63° C., there was added slowly with stirring 2.0 parts of a catalyst solution containing 4.26% by weight of 2,2'-azo-bis-(2-methylpropionitrile) in ethyl acetate. The viscosity of the solution rose rapidly after about 10 minutes and additional quantities of ethyl acetate were introduced at intervals to ensure that stirring of the solution continued to be effective, and additional quantities of catalyst solution were also added at intervals. The temperature of the reaction solution increased to about 90° C. near the beginning of the polymerization reaction. After a total time of 4½ hours at an average temperature of 85° C. during the course of which the total amount of catalyst introduced was 0.3% by weight of the monomers, there was no further increase in viscosity and there was obtained a solution containing (after dilution with toluene) 12.7% by weight of polymer representing a conversion of 94% of the theoretical. The Brookfield viscosity of the solution at 20 r.p.m. was 7050 cps.

EXAMPLES 2-14

In Examples 2-14, polymer solutions were prepared using the procedure and catalyst solution described in Example 1 and employing the ingredients, amounts and reaction conditions set forth in the following tables. In Examples 7 and 9, a special procedure was used in which all the vinyl acetate and approximately 25% of the other monomers and solvent was added initially, the remainder being introduced dropwise into the reaction solution after the initial temperature rise was observed.

TABLE I

| | Examples | | | | | |
|---|---|---|---|---|---|---|
| | 2 | 3 | 4 | 5 | 6 | 7 |
| Comonomer amounts, grams: | | | | | | |
| Acrylic acid | 7.20 | 3.80 | 3.20 | 3.20 | | 3.20 |
| Itaconic acid | | | | | 5.80 | |
| Dimethylaminoethyl methacrylate | 15.70 | | 7.00 | | 7.00 | 7.00 |
| t-Butylaminoethyl methacrylate | | 8.30 | | | | |
| Diethylaminoethyl acrylate | | | | 7.00 | | |
| Ethyl acrylate | 20.0 | 10.50 | | | | |
| Butyl acrylate | | | | | 20.00 | |
| 2-ethylhexyl acrylate | 147.2 | 77.4 | 89.8 | 89.8 | 67.2 | 69.4 |
| Vinyl acetate | | | | | | 20.0 |
| Glycidyl acrylate | | | 0.5 | 0.5 | | 0.4 |
| Total catalyst (percent by wt. of monomers) | 0.4 | 0.3 | 0.4 | 0.4 | 0.3 | 0.4 |
| Ethyl acetate solvent, ml | 200 | 80 | 80 | 80 | 60 | 80 |
| Methyl alcohol solvent, ml | | | | | 30 | |
| Diluted during reaction with— | | | | | | |
| Toluene | | | | | (¹) | |
| Ethyl acetate | (¹) | (¹) | (¹) | (¹) | | (¹) |
| Initial temperature, °C | 70 | 50 | 50 | 50 | 60 | 60 |
| Reaction time, hours | 6 | 4 | 3¾ | 5 | 3½ | 4 |
| Average reaction temp. °C | 80 | 80 | 80-85 | 80-85 | 80 | 80 |
| Final solids, percent by wt | 41 | 8.2 | 25 | 42 | 39 | 30 |
| Conversion, percent | | 93 | 98 | 97 | 91 | 90 |
| Brookfield viscosity at 20 r.p.m | 13,250 | ²13,460 | 165 | 360 | | GEL |

¹ Dilution with indicated solvent.
² At 10 r.p.m.

TABLE II

| | Examples | | | | | | |
|---|---|---|---|---|---|---|---|
| | 8 | 9 | 10 | 11 | 12 | 13 | 14 |
| Comonomer amounts, grams: | | | | | | | |
| Acrylic acid | 1.84 | | | | 0.92 | | |
| Itaconic acid | | 2.90 | 1.45 | | | | |
| Maleic anhydride | 3.12 | | | | | | |
| Water | 0.60 | | | | | | |
| Beta-methacryloyloxyethyl acid succinate | | | | | | 2.94 | 10.24 |
| Dimethylaminoethyl methacrylate | 5.0 | 4.00 | 3.50 | 3.50 | 2.00 | 2.00 | 7.00 |
| Butyl acrylate | | | 20.0 | 95.0 | 97.1 | 95.1 | |
| 2-ethylhexyl acrylate | 91.9 | 73.8 | 73.6 | | | | 82.3 |
| Vinyl acetate | | 20.0 | | | | | |
| Glycidyl acrylate | 0.5 | 0.4 | | | | | 0.5 |
| Total catalyst (percent by wt. of monomers) | 0.2 | 0.4 | 0.3 | 0.3 | 0.2 | 0.4 | 0.4 |
| Ethyl acetate solvent, ml | 80 | 100 | 23 | 80 | 80 | 80 | 80 |
| Hexane solvent, ml | | | 23 | | | | |
| Methyl alcohol solvent, ml | | | 23 | 25 | | | |
| Diluted during reaction with— | | | | | | | |
| Toluene | | (¹) | | | | (¹) | (¹) |
| Ethyl acetate | (¹) | | (¹) | (¹) | | | |
| Initial temperature, °C | 60 | 76 | 67 | 55 | 55 | 52 | 50 |
| Reaction time, hours | 4 | 5¼ | 4 | 4 | 2 | 6 | 5 |
| Average reaction temp. °C | 80 | 80 | 75 | 72 | 85 | 85 | 85 |
| Final solids, percent by wt | 45 | 39 | 26 | 28 | 38 | 36 | 23 |
| Conversion, percent | 97 | 89 | 87 | 90 | 91 | 96 | 94 |
| Brookfield viscosity at 20 r.p.m | 300 | 660 | 255 | 1,175 | 1,600 | 1,440 | 330 |

¹ Dilution with indicated solvent.

The polymer solutions of the foregoing examples were spread separately on 1.5 mil polyethylene terephthalate film, dried and (in the case of those polymers containing glycidyl acrylate) cured by heating at 300° F. for a given period of time to provide a pressure sensitive adhesive tape. The adhesive properties of the tape were then determined with the results set forth in Table III. The probe tack was determined by means of a Polyken probe tack tester as described in U.S. Pat. 3,214,971 having the following 4 functional parts: (1) a cylindrical steel probe attached to the compression loaded spring of (2) a series L Hunter mechanical force gauge (Hunter Spring Company, Brochure 750/FG, revised February 1961), (3) an annulus having an opening slightly larger than the diameter of the probe and (4) a carrier for the annulus which moves down to bring the annulus around the probe and then up to remove the annulus therefrom. The carrier moves at a speed of 0.1 inch per second. At the beginning of the test, the carrier is at its uppermost point of travel and the annulus rests upon the carrier so that the opening in the annulus is in line with the probe positioned beneath it. In carrying out the test, a strip of tape is placed upon the annulus, adhesive side down, and spanning the annulus, opening. As the carrier is driven downwardly by the synchronous motor, the adhesive surface exposed through the opening is brought into contact with the flat surface of the probe so that the tape and the annulus attached thereto are suspended on the probe as the carrier continues farther on its downward path. The carrier then reverses its movement returning to pick up the annulus, thereby separating the tape from the probe surface. Separation begins after one second contact between the probe and the adhesive. The force required to separate the tape from the probe is recorded on a gauge. The recorded value is the probe tack value. Measurements were made employing a loading of 100 grams/cm.².

The peel adhesion values represent the forces required to remove a one-inch wide adhesive tape from a stainless steel surface after contact therewith for 2 minutes at a temperature of about 75° F. The tape is stripped from the surface at an angle of 180° at a rate of 12 inches per minute.

The creep resistance values are determined by applying to a vertical stainless steel surface heated to a temperature of about 160° F. a strip of the adhesive tape 1 inch wide, after which a 1 kilogram weight is hung from the tape. The creep time is the length of time required for the tape to travel ½ inch on the surface.

TABLE III

| Properties: | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Cure, min. at 300° F | | | | 2 | | 5 | | 2 | 5 | 2 | | | | 2 |
| Dry thickness of polymer coating, mils | 2 | 1.5 | 2 | 2 | 2 | 1.6 | 1.7 | 1.5 | 1.8 | 1.6 | 2 | (¹) | 1.7 |
| Probe tack, grams | 60 | 800 | 20 | 680 | 1,360 | 580 | 630 | 690 | 940 | 710 | 780 | 970 | (¹) | 590 |
| Creep, hours | 0.01 | 19.8 | N.C. | N.C. | 0.15 | N.C. | N.C. | N.C. | 0.03 | 0.08 | 0.09 | (¹) | N.C. |
| Peel adhesion oz. at 75° F | D | 50 | 12 | 40 | 58 | 15 | 36 | 24 | 39 | 57 | 35 | 58 | (¹) | 18 |

¹ Too soft to measure due to low molecular weight.

NOTE.—N.C.=No creep after 100 hours. D=Polymer coating delaminated from the support film.

What is claimed is:

1. An adhesive tape comprising a flexible backing and supported thereon a pressure-sensitive adhesive polymer of monomers consisting essentially of
   (1) at least one carboxylic acid vinyl monomer selected from the group consisting of acrylic, methacrylic, maleic, fumaric itaconic and citraconic acid and those monomers having the formula

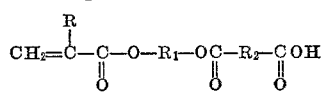

in which R is hydrogen or methyl, $R_1$ is an alkylene group having from 2 to 10 carbon atoms or $R_1$ is

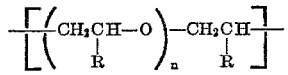

where $n$ is 1 to 4; and $R_2$ is alkylene having 2 to 26 carbon atoms, phenylene, a 5- to 6-membered monocyclic or 7- to 8-membered bicyclic ring having a carbon-to-carbon skeletal chain and being free from aromatic unsaturation including those in which one or more of the hydrogen atoms of said phenylene or of said rings is replaced by lower alkyl or by a halogen atom, provided that the valences in $R_2$ connected to the adjacent carbonyl groups are on adjacent carbon atoms or on those separated by one additional carbon atom, and provided the number of ring carbon atoms between the carbonyl groups is 1 or 2,
   (2) at least one aminoalkyl acrylate or methacrylate having the formula

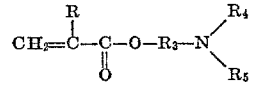

in which R is hydrogen or methyl, $R_3$ is alkylene having from 2 to 12 carbon atoms, and $R_4$ and $R_5$ is each an alkyl group having from 1 to 4 carbon atoms except that when $R_4$ is tertiary butyl $R_5$ is hydrogen, and
   (3) at least one alkyl acrylate the molecules of which have the formula

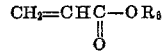

in which $R_6$ represents an alkyl group having up to 18 carbon atoms, the average number of carbon atoms in such groups being from 4 to 14, the amount of carboxylic acid vinyl monomer in said polymer being from 0.2 to 20% by weight of the total monomers but in no event more than an amount equivalent, in terms of acidity, to 10% by weight of acrylic acid, the amount of said aminoalkyl acrylate or methacrylate being within ±10% of the amount which is the acid-base equivalent of the carboxylic acid vinyl monomer and in any even from 0.2 to 15% by weight of the total monomers, and the amount of alkyl acrylate monomer being from 65 to 99.6% by weight of the total monomers.

2. An adhesive tape as claimed in claim 1 in which $R_1$ is an alkylene group having from 2 to 4 carbon atoms and $R_2$ is alkylene having from 1 to 4 carbon atoms, o-phenylene, or cyclohexylene.

3. An adhesive tape as claimed in claim 1 in which the amount of said carboxylic acid vinyl monomer is an amount equivalent in terms of acidity to 0.5 to 5% by weight of acrylic acid.

4. An adhesive tape as claimed in claim 1 in which the carboxylic acid vinyl monomer is acrylic acid or methacrylic acid.

5. An adhesive tape as claimed in claim 1 in which the aminoalkyl acrylate or methacrylate monomer is dimethylaminoethyl methacrylate.

6. An adhesive tape as claimed in claim 1 in which the aminoalkyl acrylate or methacrylate monomer is diethylaminoethyl acrylate.

7. An adhesive tape as claimed in claim 1 in which the aminoalkyl acrylate or methacrylate monomer is t-butylaminoethyl methacrylate.

8. An adhesive tape as claimed in claim 1 in which the carboxylic acid vinyl monomer is maleic acid.

9. An adhesive tape as claimed in claim 1 in which the carboxylic acid vinyl monomer is itaconic acd.

10. An adhesive tape as claimed in claim 1 in which the carboxylic acid vinyl monomer is beta-methacryloyloxyethyl acid succinate.

11. A pressure-sensitive adhesive polymer of monomers consisting essentially of
    (1) at least one carboxylic acid vinyl monomer selected from the group consisting of acrylic, methacrylic, maleic, fumaric, itaconic and citraconic acid and those monomers having the formula

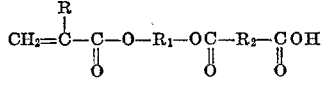

in which R is hydrogen or methyl, $R_1$ is an alkylene group having from 2 to 10 carbon atoms or $R_1$ is

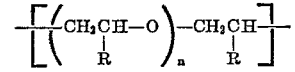

where $n$ is 1 to 4; and $R_2$ is alkylene having 2 to 26 carbon atoms, phenylene, a 5- to 6-membered monocyclic or 7- or 8-membered bicyclic ring having a carbon-to-carbon skeletal chain and being free from aromatic unsaturation including those in which one or more of the hydrogen atoms of said phenylene or of said rings is replaced by lower alkyl or by a halogen atom, provided that the valences in $R_2$ connected to the adjacent carbonyl groups are on adjacent carbon atoms or on those separated by one additional carbon atom, and provided the number of ring carbon atoms between the carbonyl groups is 1 tor 2,
    (2) at least one aminoalkyl acrylate or methacrylate having the formula

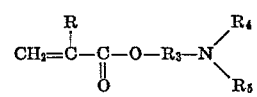

in which R is hydrogen or methyl, $R_3$ is alkylene having from 2 to 12 carbon atoms, and $R_4$ and $R_5$ is each an alkyl group having from 1 to 4 carbon atoms except that when $R_4$ is tertiary butyl $R_5$ is hydrogen, and (3) at least one alkyl acrylate the molecules of which have the formula

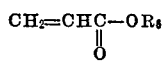

in which $R_6$ represents an alkyl group having up to 18 carbon atoms, the average number of carbon atoms in such groups being from 4 to 14, the amount of carboxylic acid vinyl monomer in said polymer being from 0.2 to 20% by weight of the total monomers but in no event more than an amount equivalent, in terms of acidity, to 10% by weight of acrylic acid, the amount of said aminoalkyl acrylate or methacrylate being within ±10% of the amount which is the acid-base equivalent of the carboxylic acid vinyl monomer and in any event from 0.2 to 15% by weight of the total monomers.

and the amount of alkyl acrylate monomer being from 65 to 99.6% by weight of the total monomers.

12. A pressure-sensitive adhesive polymer as claimed in claim 11 in which $R_2$ is an alkylene group having from 2 to 4 carbon atoms and $R_3$ is alkylene having from 1 to 4 carbon atoms, o-phenylene, or cyclohexylene.

13. A pressure-sensitive adhesive polymer as claimed in claim 11 in which the amount of said carboxylic vinyl monomer is an amount equivalent in terms of acidity to 0.5 to 5% by weight of acrylic acid.

14. A pressure-sensitive adhesive polymer as claimed in claim 11 in which the carboxylic vinyl monomer is acrylic acid.

15. A pressure-sensitive adhesive polymer as claimed in claim 11 in which the aminoalkyl acrylate or methacrylate monomer is dimethylaminoethyl methacrylate.

16. A pressure-sensitive adhesive polymer as claimed in claim 11 in which the aminoalkyl acrylate or methacrylate monomer is diethylaminoethyl methacrylate.

17. A pressure-sensitive adhesive polymer as claimed in claim 11 in which the aminoalkyl acrylate or methacrylate monomer is t-butylaminoethyl acrylate.

18. A pressure-sensitive adhesive polymer as claimed in claim 11 in which the carboxylic acid vinyl monomer is maleic acid.

19. A pressure-sensitive adhesive polymer as claimed in claim 11 in which the carboxylic acid vinyl monomer is itaconic acid.

20. A pressure-sensitive adhesive polymer as claimed in claim 11 in which the carboxylic acid vinyl monomer is beta-methacryloyloxyethyl acid succinate.

References Cited
UNITED STATES PATENTS

| | | | |
|---|---|---|---|
| 3,325,459 | 6/1967 | Gander | 260—80.5 |
| 3,404,114 | 10/1968 | Snyder et al. | 260—29.6 |
| 3,535,295 | 10/1970 | Davis et al. | 260—80.8 |
| 3,341,505 | 9/1967 | Gander | 260—86.1 |
| 3,654,213 | 4/1972 | Christenson et al. | 260—33.6 |
| 3,535,293 | 10/1970 | Anderson | 260—78.5 |
| 3,150,118 | 9/1964 | Clemens | 260—78.5 |

JOSEPH L. SCHOFER, Primary Examiner

J. KIGHT III, Assistant Examiner

U.S. Cl. X.R.

117—122 P, 161 UN, 161 UC; 156—327; 260—78.5 E, 80.73, 80.8, 80.81

PO-1050
(5/69)

UNITED STATES PATENT OFFICE
CERTIFICATE OF CORRECTION

Patent No. 3,790,533      Dated February 5, 1974

Inventor(s) Carlos M. Samour

It is certified that error appears in the above-identified patent and that said Letters Patent are hereby corrected as shown below:

Column 4, line 3, "accomplished" is misspelled;

Column 4, line 21, "ore" should be --or--;

Column 5, line 32, "acetate" is misspelled;

Column 7, line 69, "even" should be --event--;

Column 8, line 33, "acid" is misspelled;

Column 8, line 64, "tor" should be --or--;

Column 9, line 26, "$R_2$" should be --$R_1$--.

Signed and sealed this 14th day of May 1974.

(SEAL)
Attest:

EDWARD M. FLETCHER, JR.
Attesting Officer

C. MARSHALL DANN
Commissioner of Patents